US011292892B2

(12) United States Patent
Ni et al.

(10) Patent No.: US 11,292,892 B2
(45) Date of Patent: Apr. 5, 2022

(54) FLAME RETARDANT COMPOSITION AND FLAME RETARDANT RESIN COMPOSITION CONTAINING SAME

(71) Applicant: ADEKA CORPORATION, Tokyo (JP)

(72) Inventors: Yang Ni, Saitama (JP); Yutaka Yonezawa, Saitama (JP); Naoko Tanji, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 106 days.

(21) Appl. No.: 16/498,510

(22) PCT Filed: May 15, 2018

(86) PCT No.: PCT/JP2018/018820
§ 371 (c)(1),
(2) Date: Sep. 27, 2019

(87) PCT Pub. No.: WO2018/216558
PCT Pub. Date: Nov. 29, 2018

(65) Prior Publication Data
US 2020/0048433 A1    Feb. 13, 2020

(30) Foreign Application Priority Data

May 25, 2017    (JP) ............................. JP2017-103364

(51) Int. Cl.
| C08K 5/52 | (2006.01) |
| C08K 3/22 | (2006.01) |
| C08K 5/057 | (2006.01) |
| C08L 101/00 | (2006.01) |
| C09K 21/02 | (2006.01) |
| C09K 21/12 | (2006.01) |
| C09K 21/14 | (2006.01) |
| C08K 5/00 | (2006.01) |

(52) U.S. Cl.
CPC .................. *C08K 5/52* (2013.01); *C08K 3/22* (2013.01); *C08K 5/057* (2013.01); *C08L 101/00* (2013.01); *C09K 21/02* (2013.01); *C09K 21/12* (2013.01); *C09K 21/14* (2013.01); *C08K 5/0066* (2013.01); *C08K 2003/2296* (2013.01); *C08L 2201/02* (2013.01)

(58) Field of Classification Search
CPC ...................................................... C09K 21/06
See application file for complete search history.

(56) References Cited

U.S. PATENT DOCUMENTS

| 2012/0178861 A1* | 7/2012 | Nomura ................... C08K 5/25 |
| | | 524/192 |
| 2012/0329920 A1 | 12/2012 | Sato et al. |
| 2016/0052927 A1 | 2/2016 | Pfaendner et al. |
| 2016/0244591 A1 | 8/2016 | Andrews et al. |
| 2017/0260363 A1 | 9/2017 | Pfaendner et al. |
| 2017/0342239 A1 | 11/2017 | Ni et al. |
| 2019/0010308 A1 | 1/2019 | Lips et al. |

FOREIGN PATENT DOCUMENTS

| CN | 105102522 A | 11/2015 |
| CN | 106715560 A | 5/2017 |
| JP | 7-286104 A | 10/1995 |
| JP | 7-304896 A | 11/1995 |
| JP | 7-331006 A | 12/1995 |
| TW | 201715030 A | 5/2017 |
| WO | 2010/138330 A2 | 12/2010 |
| WO | 2012/043219 A1 | 4/2012 |

OTHER PUBLICATIONS

International Search Report, dated Aug. 7, 2018, from corresponding International Application No. PCT/JP2018/018820.

\* cited by examiner

*Primary Examiner* — Peter F Godenschwager
(74) *Attorney, Agent, or Firm* — Nixon & Vanderhye

(57) ABSTRACT

Disclosed is a flame retardant composition containing (A) an amine phosphate and (B) a zinc glycerolate. It is preferred that component (A) contain an amine pyrophosphate and that the mass ratio of component (A) to component (B) be 99.99:0.01 to 60:40. The flame retardant composition preferably further contains (C) zinc oxide, wherein the content of component (C) is 0.01 to 10 parts by mass per 100 parts by mass of the sum of components (A) and (B). The flame retardant composition preferably further contains (D) hydrotalcite, wherein the content of component (D) is 0.01 to 5 parts by mass per 100 parts by mass of the sum of components (A) and (B).

14 Claims, No Drawings

FLAME RETARDANT COMPOSITION AND FLAME RETARDANT RESIN COMPOSITION CONTAINING SAME

TECHNICAL FIELD

This invention relates to a flame retardant composition and a flame-retardant resin composition containing the same.

BACKGROUND ART

Resins have been applied widely to constructional materials, automotive parts, packaging materials, agricultural materials, housings of household electric appliances, toys, and so forth because of the advantages, such as good moldability, excellent thermal and mechanical characteristics, low specific gravity, and low weight. Most of synthetic resins are combustible and it is necessary to impart flame retardancy to them for some applications. In particular, highly combustible synthetic resins including polyolefin resins are frequently used in a wide range of fields, and it is necessary to add a flame retardant to the resins to make them flame-retardant.

It is well known that flame retardation of resins is achieved by using halogen flame retardants, inorganic phosphorus flame retardants, including red phosphorus and polyphosphoric acid flame retardants, such as ammonium polyphosphates, organic phosphorus flame retardants typified by triarylphosphoric ester compounds, metal hydroxides, such as magnesium hydroxide, antimony oxide, which is a flame retardant synergist, and melamine compounds, either alone or as a combination thereof.

Halogen flame retardants have the problem of toxic gas generation upon combustion. The problem with metal hydroxides is that sufficient flame retardancy is not obtained unless they are added in large quantities, and such addition impairs resin processability and reduces the physical properties of molded products. Hence, it has been attempted to use a phosphorous flame retardant that is free of these problems. For example, patent literature 1 listed below discloses a flame retardant composition containing a melamine salt, a pyrophosphate, and a bicyclophosphoric ester.

Patent literature 2 below lists zinc glycerolate as one of useful nucleating agents. Patent literature 3 below teaches imparting flame retardancy to synthetic resins by the combined use of an alkaline earth metal or zinc salt of glycerol and a halogen flame retardant.

However, the flame retardant composition of patent literature 1 has the problem that sufficient flame retardancy is not imparted when added in a reduced amount. Patent literature 2 neither discloses nor suggests using zinc glycerolate as a flame retardant. Patent literature 3 relates to flame retardation by the combined use with a halogen flame retardant, involving the problems of safety as well as flame retardant performance.

CITATION LIST

Patent Literature

Patent literature 1: US 2017/342239A1
Patent literature 2: WO2010/138330A2
Patent literature 3: JP 7-304896A

SUMMARY OF INVENTION

An object of the invention is to provide a flame retardant composition that is capable of imparting excellent flame retardancy to resins even in a small amount and a flame-retardant resin composition.

As a result of intensive investigation, the inventors have found that a flame retardant composition containing a specific compound is capable of imparting excellent flame retardancy to resins when using even in a small amount. The invention has been completed based on this finding. Specifically, the invention provides the following.
(Invention 1)
A flame retardant composition containing (A) an amine phosphate and (B) a zinc glycerolate.
(Invention 2)
The flame retardant composition according to invention 1, wherein component (A) comprises an amine pyrophosphate, and the mass ratio of component (A) to component (B) is 99.99:0.01 to 60:40.
(Invention 3)
The flame retardant composition according to invention 1 or 2, further comprising (C) zinc oxide, wherein the content of component (C) is 0.01 to 10 parts by mass per 100 parts by mass of the sum of components (A) and (B).
(Invention 4)
The flame retardant composition according to any one of inventions 1 to 3, further comprising (D) hydrotalcite, wherein the content of component (D) is 0.01 to 5 parts by mass per 100 parts by mass of the sum of components (A) and (B).
(Invention 5)
A flame-retardant resin composition comprising 100 parts by mass of a resin and 1 to 100 parts by mass of the flame retardant composition according to any one of inventions 1 to 4.
(Invention 6)
A molded article obtained by molding the flame-retardant resin composition according to invention 5.
(Invention 7)
A method for rendering a resin flame retardant, comprising mixing the resin with a composition comprising (A) an amine phosphate and (B) a zinc glycerolate.
(Invention 8)
Use of a composition comprising (A) an amine phosphate and (B) a zinc glycerolate as a flame retardant.

DESCRIPTION OF EMBODIMENTS

The invention relates to a flame retardant composition and a flame-retardant resin composition. The invention will be described on the basis of its preferred embodiments.
Flame Retardant Composition
The flame retardant composition of the invention essentially contains (A) an amine phosphate and (B) a zinc glycerolate.
Component (A)
The flame retardant composition of the invention contains an amine phosphate as component (A). As used herein, the term "amine phosphate" is intended to mean a composition containing at least a salt between a phosphoric acid and an amine.
The term "phosphoric acid" as in the amine phosphate is a generic term including monophosphoric acids and polyphosphoric acids. The monophosphoric acids are exemplified by orthophosphoric acid ($H_3PO_4$). Examples of the polyphosphoric acids include pyrophosphoric acid ($H_4P_2O_7$) (also known as diphosphoric acid), triphosphoric acid ($H_5P_3O_{10}$), and metaphosphoric acid ($HPO_3)_k$ (k stands for a positive integer) (a kind of condensed phosphoric acids).

Examples of the amine as in the amine phosphate include ammonia, alkylamines, aromatic amines, and heterocyclic amines. The amine may have a hydroxy group.

Examples of the alkylamines include monoalkylamines represented by $R_1NH_2$, dialkylamines represented by $R_1R_2NH$, trialkylamines represented by $R_1R_2R_3N$, and diamines represented by $[R^4R^5N(CH_2)_mNR^6R^7]$, wherein $R^1$, $R^2$, and $R^3$, which may be the same or different, each represent a straight or branched chain alkyl group having 1 to 8 carbon atoms; and $R^4$, $R^5$, $R^6$, and $R^7$, which may be the same or different, each represent a hydrogen atom or a straight or branched chain alkyl group having 1 to 8 carbon atoms. Examples of the C1-C8 straight or branched chain alkyl as $R^1$ through $R^7$ include methyl, ethyl, propyl, isopropyl, butyl, sec-butyl, tert-butyl, pentyl, tert-pentyl, hexyl, heptyl, octyl, 2-ethylhexyl, and tert-octyl.

Examples of the monoalkylamines include methylamine, ethylamine, propylamine, and isopropylamine.

Examples of the dialkylamines include dimethylamine, dimethylethylamine, diethylamine, dipropylamine, methylpropylamine, ethylpropylamine, and ethylenediamine.

Examples of the trialkylamines include trimethylamine, dimethylethylamine, dimethylpropylamine, methyldiethylamine, methyldipropylamine, triethylamine, and tripropylamine.

Examples of the diamines represented by $[R^4R^5N(CH_2)_m NR^6R^7]$ include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, and 1,10-diaminodecane. "m" in the above formula is preferably 1 to 20.

Examples of the aromatic amines include aromatic monoamines, aromatic diamines, and aromatic triamines. Examples of the aromatic monoamines include aniline. Examples of the aromatic diamines include 1,2-diaminobenzene, 1,4-diaminobenzene, and 1,3-diaminobenzene. Examples of the aromatic triamines include 1,3,5-triaminobenzene.

Examples of the heterocyclic amines include those having 2 to 14 carbon atoms and at least one nitrogen atom. The heterocyclic amines may contain at least one of a sulfur atom and an oxygen atom. Examples of such heterocyclic amines include aliphatic heterocyclic amines with 2 to 7 carbon atoms, 5-membered aromatic heterocyclic amines with 2 to 4 carbon atoms, 6-membered aromatic heterocyclic amines with 2 to 5 carbon atoms, and polycyclic aromatic heterocyclic amines with 5 to 12 carbon atoms. Examples of the aliphatic heterocyclic compounds with 2 to 7 carbon atoms include piperidine, piperazine, morpholine, quinuclidine, pyrrolidine, azetidine, azetidin-2-one, and aziridine, and among these, compounds having a 4- to 9-membered ring (particularly 6-membered ring) are preferable. Examples of the 5-membered aromatic heterocyclic compounds with 2 to 4 carbon atoms include pyrrole, imidazole, pyrazole, oxazole, isoxazole, thiazole, and isothiazole. Examples of the 6-membered aromatic heterocyclic amines with 2 to 5 carbon atoms include melamine, pyridine, pyrimidine, pyridazine, pyrazine, and 1,2,3-triazine. Examples of the polycyclic aromatic heterocyclic amines with 5 to 12 carbon atoms include quinoline, isoquinoline, quinazoline, phthalazine, indole, benzimidazole, purine, acridine, and phenothiazine.

Examples of the amines having a hydroxy group include those that are derived from any of monoalkylamines represented by $R_1NH_2$, dialkylamines represented by $R_1R_2NH$, and trialkylamines represented by $R_1R_2R_3N$ and are produced by replacing one or more hydrogen atom of the alkyl group(s) thereof with a hydroxy group, including methanolamine, ethanolamine, dimethanolamine, diethanolamine, trimethanolamine, and triethanolamine.

The amine component of the amine phosphate is preferably at least one member selected from the group consisting of ammonia, an alkylamine, an aromatic amine, a heterocyclic amine, ethanolamine, diethanolamine, and diethylenetriamine, more preferably at least one member selected from the group consisting of ammonia, diethylamine, ethanolamine, diethanolamine, aniline, melamine, morpholine, ethylenediamine, piperazine, 1,2-diaminobenzene, 1,4-diaminobenzene, diethylenetriamine, methylamine, ethylamine, and dimethylamine, even more preferably melamine and piperazine.

The amine phosphate in the flame retardant composition of the invention may be derived from any combination of one or more of the phosphoric acids and one or more of the amines. For the case where using, for example, orthophosphoric acid and pyrophosphoric acid as a phosphoric acid and piperazine and melamine as an amine, examples of such amine phosphates include piperazine orthophosphate, piperazine pyrophosphate, melamine orthophosphate, melamine pyrophosphate, a double salt formed from pyrophosphoric acid, piperazine, and melamine, and a double salt formed from orthophosphoric acid, piperazine, and melamine.

In the case of a piperazine phosphate, the molar ratio of piperazine to phosphoric acid is preferably such that the molar ratio of piperazine to phosphorus atom of the phosphoric acid is 0.3 to 1.2. In the case of a melamine phosphate, the molar ratio of melamine to phosphoric acid is preferably such that the molar ratio of melamine to phosphorus atom of the phosphoric acid is 0.3 to 1.2.

The amine phosphate in the flame retardant composition of the invention preferably contains an amine pyrophosphate as an essential component. The ratio of pyrophosphoric acid in total phosphoric acids in the amine phosphate is preferably 80 to 100 mass %, more preferably 90 to 100 mass %, even more preferably 95 to 100 mass %, in terms of flame retardancy. Note that, even when only an amine pyrophosphate is used as an amine phosphate in the flame retardant composition of the invention, the amine pyrophosphate may contain an amine orthophosphate or an amine polyphosphate as a by-product. In that case, when the ratio of orthophosphoric acid in the total phosphoric acids is not more than 3 mass %, or when the ratio of the polyphosphoric acid in the total phosphoric acids is not more than 1 mass %, the pyrophosphoric acid ratio in the total phosphoric acids is regarded as 100 mass %.

The ratios of pyrophosphoric acid and orthophosphoric acid to the total phosphoric acids in the amine phosphate in the flame retardant composition of the invention can be determined by, for example, ion chromatography.

The amine phosphate in the flame retardant composition of the invention is preferably composed of a combination of a piperazine phosphate and a melamine phosphate in terms of flame retardancy and heat resistance. The mass ratio of the piperazine phosphate to the melamine phosphate is preferably 80:20 to 10:90, more preferably 70:30 to 20:80, even more preferably 70:30 to 50:50, still more preferably 65:35 to 55:45. It is more preferred that the amine phosphate be composed of a combination of piperazine pyrophosphate and melamine pyrophosphate. Preferred ranges of the mass ratio of piperazine pyrophosphate to melamine pyrophosphate are the same as for the mass ratio of the piperazine phosphate to the melamine phosphate recited above.

The content of the amine phosphate (A) in the flame retardant composition of the invention is preferably 1 to 99 mass %, more preferably 10 to 98 mass %, even more preferably 30 to 97 mass % based on the total mass of the flame retardant composition, in terms of flame retardancy. The amine phosphate content in the flame retardant composition of the invention can be measured by ion chromatography and the like.

Examples of the amine phosphate (A) include, but are not limited to, the following compositions A-1 through A-36:

A-1: A mixture of piperazine pyrophosphate (pyrophosphoric acid to piperazine molar ratio=1:1) and melamine pyrophosphate (pyrophosphoric acid to melamine molar ratio=1:2) at a mass ratio of 90:10.
A-2: A composition, the same as mixture A-1 except that the mass ratio is altered to 80:20.
A-3: A composition, the same as mixture A-1 except that the mass ratio is altered to 70:30.
A-4: A composition, the same as mixture A-1 except that the mass ratio is altered to 60:40.
A-5: A composition, the same as mixture A-1 except that the mass ratio is altered to 50:50.
A-6: A composition, the same as mixture A-1 except that the mass ratio is altered to 40:60.
A-7: A composition, the same as mixture A-1 except that the mass ratio is altered to 30:70.
A-8: A composition, the same as mixture A-1 except that the mass ratio is altered to 20:80.
A-9: A composition, the same as mixture A-1 except that the mass ratio is altered to 10:90.
A-10: A mixture of piperazine pyrophosphate (pyrophosphoric acid to piperazine molar ratio=1:2) and melamine pyrophosphate (pyrophosphoric acid to melamine molar ratio=1:2) at a mass ratio of 90:10.
A-11: A composition, the same as mixture A-10 except that the mass ratio is altered to 80:20.
A-12: A composition, the same as mixture A-10 except that the mass ratio is altered to 70:30.
A-13: A composition, the same as mixture A-10 except that the mass ratio is altered to 60:40.
A-14: A composition, the same as mixture A-10 except that the mass ratio is altered to 50:50.
A-15: A composition, the same as mixture A-10 except that the mass ratio is altered to 40:60.
A-16: A composition, the same as mixture A-10 except that the mass ratio is altered to 30:70.
A-17: A composition, the same as mixture A-10 except that the mass ratio is altered to 20:80.
A-18: A composition, the same as mixture A-10 except that the mass ratio is altered to 10:90.
A-19: A mixture of piperazine pyrophosphate (pyrophosphoric acid to piperazine molar ratio=1:1) and melamine pyrophosphate (pyrophosphoric acid to melamine molar ratio=1:1) at a mass ratio of 90:10.
A-20: A composition, the same as mixture A-19 except that the mass ratio is altered to 80:20.
A-21: A composition, the same as mixture A-19 except that the mass ratio is altered to 70:30.
A-22: A composition, the same as mixture A-19 except that the mass ratio is altered to 60:40.
A-23: A composition, the same as mixture A-19 except that the mass ratio is altered to 50:50.
A-24: A composition, the same as mixture A-19 except that the mass ratio is altered to 40:60.
A-25: A composition, the same as mixture A-19 except that the mass ratio is altered to 30:70.
A-26: A composition, the same as mixture A-19 except that the mass ratio is altered to 20:80.
A-27: A composition, the same as mixture A-19 except that the mass ratio is altered to 10:90.
A-28: A mixture of piperazine pyrophosphate (pyrophosphoric acid to piperazine molar ratio=1:2) and melamine pyrophosphate (pyrophosphoric acid to melamine molar ratio=1:1) at a mass ratio of 90:10.
A-29: A composition, the same as mixture A-28 except that the mass ratio is altered to 80:20.
A-30: A composition, the same as mixture A-28 except that the mass ratio is altered to 70:30.
A-31: A composition, the same as mixture A-28 except that the mass ratio is altered to 60:40.
A-32: A composition, the same as mixture A-28 except that the mass ratio is altered to 50:50.
A-33: A composition, the same as mixture A-28 except that the mass ratio is altered to 40:60.
A-34: A composition, the same as mixture A-28 except that the mass ratio is altered to 30:70.
A-35: A composition, the same as mixture A-28 except that the mass ratio is altered to 20:80.
A-36: A composition, the same as mixture A-28 except that the mass ratio is altered to 10:90.

Component (B)

The flame retardant composition of the invention contains a zinc glycerolate as component (B).

As used herein, the term "zinc glycerolate" is intended to mean a salt between glycerol and zinc. The zinc glycerolate may have a monomeric structure having a glycerol to zinc molar ratio of 1:1 or a polymeric structure having a glycerol to zinc molar ratio, e.g., of 1:2 or 2:1. While the zinc glycerolate (B) for use in the invention is not limited by the method of synthesis thereof, it is easily prepared through, for example, dehydration reaction between glycerol and zinc oxide or hydroxide. The zinc glycerolate (B) is not limited by the particle size, crystal form, or the presence or absence of crystallization water. Specific examples of the zinc glycerolate (B) include CAS RNs 16754-68-0, 87189-25-1, 230956-34-0, and 142227-07-4. Commercially available zinc glycerolates are suitably used, including Irgastab NA-287 from BASF and Prifer 3881 from Uniqema, Ltd. These zinc glycerolates may be used either individually or in combination of two or more thereof.

The content of the zinc glycerolate (B) in the flame retardant composition of the invention is preferably 0.01 to 50 mass %, more preferably 0.1 to 30 mass %, even more preferably 1 to 20 mass % based on the total mass of the flame retardant composition, in terms of flame retardancy. The zinc glycerolate content in the flame retardant composition of the invention can be measured by ICP-OES, ion chromatography, XRF, NMR, and the like.

The mass ratio of component (A) to component (B) in the flame retardant composition of the invention is preferably 99.99:0.01 to 60:40, more preferably 99.9:0.1 to 70:30, even more preferably 99:1 to 80:20, in terms of flame retardancy.

Specific examples of the flame retardant composition of the invention include, but are not limited to, compositions numbered from 1 through 35 shown below. Any other compositions that contain the amine phosphate (A) and the zinc glycerolate (B) are useful as well.

No. 1: A flame retardant composition prepared by mixing component A-1 and component (B) at a mass ratio of 99.99:0.01.

No. 2: A flame retardant composition prepared by mixing component A-1 and component (B) at a mass ratio of 99:1.

No. 3: A flame retardant composition prepared by mixing component A-1 and component (B) at a mass ratio of 98:2.

No. 4: A flame retardant composition prepared by mixing component A-1 and component (B) at a mass ratio of 95:5.

No. 5: A flame retardant composition prepared by mixing component A-1 and component (B) at a mass ratio of 93:7.

No. 6: A flame retardant composition prepared by mixing component A-1 and component (B) at a mass ratio of 90:10.

No. 7: A flame retardant composition prepared by mixing component A-1 and component (B) at a mass ratio of 80:20.

No. 8: A flame retardant composition prepared by mixing component A-3 and component (B) at a mass ratio of 98:2.

No. 9: A flame retardant composition prepared by mixing component A-3 and component (B) at a mass ratio of 95:5.

No. 10: No. 8: A flame retardant composition prepared by mixing component A-3 and component (B) at a mass ratio of 93:7.

No. 11: A flame retardant composition prepared by mixing component A-3 and component (B) at a mass ratio of 90:10.

No. 12: A flame retardant composition prepared by mixing component A-3 and component (B) at a mass ratio of 80:20.

No. 13: A flame retardant composition prepared by mixing component A-4 and component (B) at a mass ratio of 99.99:0.01.

No. 14: A flame retardant composition prepared by mixing component A-4 and component (B) at a mass ratio of 99:1.

No. 15: A flame retardant composition prepared by mixing component A-4 and component (B) at a mass ratio of 98:2.

No. 16: A flame retardant composition prepared by mixing component A-4 and component (B) at a mass ratio of 95:5.

No. 17: A flame retardant composition prepared by mixing component A-4 and component (B) at a mass ratio of 93:7.

No. 18: A flame retardant composition prepared by mixing component A-4 and component (B) at a mass ratio of 90:10.

No. 19: A flame retardant composition prepared by mixing component A-4 and component (B) at a mass ratio of 80:20.

No. 20: A flame retardant composition prepared by mixing component A-8 and component (B) at a mass ratio of 99.99:0.01.

No. 21: A flame retardant composition prepared by mixing component A-8 and component (B) at a mass ratio of 99:1.

No. 22: A flame retardant composition prepared by mixing component A-8 and component (B) at a mass ratio of 98:2.

No. 23: A flame retardant composition prepared by mixing component A-8 and component (B) at a mass ratio of 95:5.

No. 24: A flame retardant composition prepared by mixing component A-8 and component (B) at a mass ratio of 93:7.

No. 25: A flame retardant composition prepared by mixing component A-8 and component (B) at a mass ratio of 90:10.

No. 26: A flame retardant composition prepared by mixing component A-8 and component (B) at a mass ratio of 80:20.

No. 27: A flame retardant composition prepared by mixing component A-11 and component (B) at a mass ratio of 93:7.

No. 28: A flame retardant composition prepared by mixing component A-11 and component (B) at a mass ratio of 80:20.

No. 29: A flame retardant composition prepared by mixing component A-11 and component (B) at a mass ratio of 50:50.

No. 30: A flame retardant composition prepared by mixing component A-23 and component (B) at a mass ratio of 95:5.

No. 31: A flame retardant composition prepared by mixing component A-23 and component (B) at a mass ratio of 93:7.

No. 32: A flame retardant composition prepared by mixing component A-36 and component (B) at a mass ratio of 95:5.

No. 33: A flame retardant composition prepared by mixing component A-36 and component (B) at a mass ratio of 93:7.

No. 34: A flame retardant composition prepared by mixing component A-36 and component (B) at a mass ratio of 80:20.

No. 35: A flame retardant composition prepared by mixing component A-36 and component (B) at a mass ratio of 60:40.

Component (C)

The flame retardant composition of the invention preferably further contains zinc oxide as component (C). The zinc oxide (C) may be either treated or untreated. Commercially available zinc oxide products may be used, including zinc oxide JIS class 1 (from Mitsui Mining & Smelting Co., Ltd.), partially coated zinc oxide (from Mitsui Mining & Smelting), Nanofine 50 (ultrafine zinc oxide with an average particle size of 0.02 µm, from Sakai Chemical Industry Co., Ltd.), and Nanofine K (zinc silicate-coated ultrafine zinc oxide with an average particle size of 0.02 µm, from Sakai Chemical Industry). Preferred of them is the zinc oxide JIS class 1 from Mitsui Mining & Smelting Co., Ltd. These zinc oxide products may be used either individually or in combination of two or more thereof.

The zinc oxide content of the flame retardant composition of the invention is preferably 0.01 to 10 parts, more preferably 0.03 to 8 parts, even more preferably 0.05 to 5 parts, by mass per 100 parts by mass of the sum of components (A) and (B). The zinc oxide content of the flame retardant composition of the invention can be measured by ICP-OES, IR spectroscopy, and the like.

Component (D)

The flame retardant composition of the invention preferably further contains hydrotalcite as component (D).

Hydrotalcite is a complex salt compound composed of magnesium, aluminum, hydroxyl groups, a carbonic group, and optionally crystallization water, which is known as naturally occurring or synthetic. In the hydrotalcite, part of magnesium or aluminum may be replaced with other metals, such as alkali metals and zinc, and its hydroxyl group or carbonic group may be replaced with other anionic groups. Water of crystallization of the hydrotalcite may be removed. The hydrotalcite may be coated with a higher fatty acid (e.g., stearic acid), a higher fatty acid metal salt (e.g., alkali metal oleate), an organic sulfonic acid metal salt (e.g., alkali metal dodecylbenzenesulfonate), a higher fatty acid amide, a higher fatty acid ester, or a wax. Hydrotalcite may be used irrespective of their crystal structure, crystal grain size, and the like. Commercially available hydrotalcite products may be used without particular limitation, including DHT-4A, Alkamizer-1, Alcamizer-2, Alcamizer-4, Alcamizer-7, HT-1, HT-7, and HT-P (all from Kyowa Chemical Industry Co., Ltd.); and NAOX-19, NAOX-19T, NAOX-33, NAOX-54, NAOX-55, NAOX-56, NAOX-57, NAOX-71, NAOX-72, NAOX-81, NAOX-91, OPTIMA-LSA, OPTIMA-XT, and MAGGOLD (all from Toda Kogyo Corp.). DHT-4 is suitable among them. These hydrotalcite compounds may be used either individually or in combination of two or more thereof.

The content of hydrotalcite in the flame retardant composition of the invention is preferably 0.01 to 5 parts, more preferably 0.03 to 3 parts, by mass per 100 parts by mass of the sum of components (A) and (B). The hydrotalcite content of the flame retardant composition of the invention can be measured by ICP-OES, IR spectroscopy, and the like.

If desired, the flame retardant composition of the invention may contain a phenolic, phosphite, thioether, or any other antioxidant, a nucleating agent, a lubricant, an ultraviolet absorber, a light stabilizer, other flame retardants, a plasticizer, a filler, a fatty acid metal salt, an antistatic, a pigment, a dye, and so forth, provided that it contains the amine phosphate (A) and the zinc glycerolate (B). These additive components may be previously incorporated into the flame retardant composition of the invention or be added in the preparation of the flame-retardant resin composition hereinafter described.

Examples of the phenolic antioxidant include 2,6-di-t-butyl-4-methylphenol, 2,6-di-t-butyl-4-ethylphenol, 2-t-butyl-4,6-dimethylphenol, styrenated phenol, 2,2'-methylenebis(4-ethyl-6-t-butylphenol), 2,2'-thiobis(6-t-butyl-4-methylphenol), 2,2'-thiodiethylene-bis[3-(3,5-di-t-butyl-4-hydroxy phenyl)propionate], 2-methyl-4,6-bis(octylsulfanylmethyl)phenol, 2,2'-isobutydenebis(4,6-dimethylphenol), isooctyl-3-(3,5-di-t-butyl-4-hydroxyphenyl)propionate, N,N'-hexane-1,6-diylbis[3-(3,5-di-t-butyl-4-hydroxyphenyl)propionamide, 2,2'-oxamidebis[ethyl-3-(3,5-di-t-butyl-4-hydroxyphenyl)propionate], 2-ethylhexyl-3-(3',5'-di-t-butyl-4'-hydroxyphenyl)propionate, 2,2'-ethylene-bis(4,6-di-t-butylphenol), 3,5-di-t-buyl-4-hydroxybenzene propanoic acid C13-15 alkyl esters, 2,5-di-t-amylhydroquinone, a hindered phenol polymer (AO.OH.98, manufactured by ADEKA Palmarole SAS), 2,2'-methylenebis[6-(1-methylcyclohexyl)-p-cresol], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 6-[3-(3-t-butyl-4-hydroxy-5-methyl)propoxy]-2,4,8,10-tetra-t-butylbenz[d, f][1,3,2]-dioxa phosphepin, hexamethylenebis[3-(3,5-di-t-butyl-4-hydroxyphenyl)propionate, calcium bis[monoethyl(3,5-di-t-butyl-4-hydroxybenzyl)phosphonate], a reaction product between 5,7-bis(1,1-dimethylethyl)-3-hydroxy-2(3H)-benzofuranone and o-xylene, 2,6-di-t-butyl-4-(4,6-bis(octylthio)-1,3,5-triazin-2-ylamino)phenol, DL-α-tocopherol (vitamin E), 2,6-bis(α-methylbenzyl)-4-methylphenol, bis[3,3-bis(4'-hydroxy-3'-t-butylphenyl)butanoic acid]glycol ester, 2,6-di-t-butyl-p-cresol, 2,6-diphenyl-4-octadecyloxyphenol, stearyl (3,5-di-t-butyl-4-hydroxyphenyl)propionate, distearyl(3,5-di-t-butyl-4-hydroxybenzyl) phosphonate, tridecyl 3,5-di-t-butyl-4-hydroxybenzylthioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl)butyric acid] glycol ester, 4,4'-butylidenebis(2,6-di-t-butylphenol), 4,4'-butylidene-bis(6-t-butyl-3-methylphenol), 2,2'-ethylidenebis(4,6-di-t-butylphenol), 1,1,3-tris(2-methyl-4-hydroxy-5-t-butylphenyl) butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxy benzyl)-2,4,6-trimethylbenzene, 1,3,5-tris[(3,5-di-t-butyl-4-hydroxyphenyl)propionyloxyethyl] isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-(3-t-butyl-4-hydroxy-5-methylphenyl)propanoyloxy]-1,1-dimethylethyl]-2,4,8,1 0-tetraoxaspiro[5.5]undecane, triethylene glycol bis(3-t-butyl-4-hydroxy-5-methylphenyl)propionate, and 3-(3,5-dialkyl-4-hydroxy phenyl)propionic acid derivatives, such as stearyl-3-(3,5-di-tert-butyl-4-hydroxyphenyl)propionamide, palmityl-3-(3,5-di-tert-butyl-4-hydroxy phenyl)propionamide, myristyl-3-(3,5-di-tert-butyl-4-hydroxy phenyl)propionamide, and lauryl-3-(3,5-di-tert-butyl-4-hydroxyphenyl)propionamide. These phenolic antioxidants may be used either individually or in combination thereof.

The phenolic antioxidant content of the flame retardant composition is selected from the range that does not impair the effects of the invention and is preferably 0.001 to 5 parts, more preferably 0.01 to 1.0 part, by mass per 100 parts by mass of the flame retardant composition.

Examples of the phosphite antioxidant include triphenyl phosphite, diisooctyl phosphite, heptakis(dipropylene glycol) triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol) phosphite, diisodecyl pentaerythritol diphosphite, dioleyl hydrogen phosphite, trilauryl trithiophosphite, bis(tridecyl) phosphite, tris(isodecyl) phosphite, tris(tridecyl) phosphite, diphenyldecyl phosphite, dinonylphenyl-bis(nonylphenyl) phosphite, poly(dipropylene glycol)phenyl phosphite, tetraphenyldipropylene glycol diphosphite, trisnonylphenyl phosphite, tris(2,4-di-t-butylphenyl) phosphite, tris(2,4-di-t-butyl-5-methylphenyl) phosphite, tris[2-t-butyl-4-(3-t-butyl-4-hydroxy-5-methylphenylthio)-5-methylphenyl]phosphite, tridecyl phosphite, octyldiphenyl phosphite, didecyl monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl) pentaerythritol diphosphite, bis(2,4-di-t-butylphenyl) pentaerythritol diphosphite, bis(2,6-di-t-butyl-4-methylphenyl) pentaerythritol diphosphite, bis(2,4,6-tri-t-butylphenyl) pentaerythritol diphosphite, bis(2,4-dicumylphenyl) pentaerythritol diphosphite, tetraphenyl-tetra(tridecyl)pentaerythritol tetraphosphite, bis (2,4-di-t-butyl-6-methylphenyl)ethyl phosphite, tetra(tridecyl)isopropylidenediphenol diphosphite, tetra(tridecyl)-4, 4'-n-butylidenebis(2-t-butyl-5-methylphenol) diphosphite, hexa(tridecyl)-1,1,3-tris(2-methyl-4-hydroxy-5-t-butylphenyl)butane triphosphite, tetrakis(2,4-di-t-butylphenyl)biphenylene diphosphonite, 9,10-dihydro-9-oxa-10-phosphaphenanthrene 10-oxide, (1-methyl-1-propanyl-3-ylidene)-tris(1,1-dimethylethyl)-5-methyl-4,1-phenylene)hexatridecyl phosphite, 2,2'-methylenebis(4,6-t-butylphenyl)-2-ethylhexyl phosphite, 2,2'-methylenebis(4,6-di-t-butylphenyl) octadecyl phosphite, 2,2'-ethylidenebis(4,6-di-t-butylphenyl) fluorophosphite, 4,4'-butylidenebis(3-methyl-6-t-butylphenylditridecyl) phosphite, tris(2-[(2,4,8,10-tetrakis-t-butyldibenzo[d, f][1,3,2]dioxaphosphepin-6-yl)oxy]ethyl) amine, 3,9-bis(4-nonylphenoxy)-2,4,8,10-tetraoxa-3,9-diphosphaspiro[5,5]undecane, 2,4,6-tri-t-butylphenyl-2-butyl-2-ethyl-1,3-propanediol phosphite, 4,4'-isopropylidenediphenol C12-15 alcohol phosphites, 3,9-bis(2,6-di-t-butyl-4-methylphenyl)-3,9-bis-diphospha-2,4,8,10-tetraoxa-3,9-diphosphe sspiro[5,5]undecane, diphenyl isodecyl phosphite, and biphenyl diphenyl phosphite. These phosphite antioxidants may be used either individually or in combination.

The phosphite antioxidant content of the flame retardant composition is selected from the range that does not impair the effects of the invention and is preferably 0.001 to 5 parts, more preferably 0.01 to 1.0 part, by mass per 100 parts by mass of the flame retardant composition.

Examples of the thioether antioxidant include 3,3'-thiodipropionic acid, alkyl(C12-C14)thiopropionic acid, dilauryl 3,3'-thiodipropionate, ditridecyl 3,3'-thiodipropionate, dimyristyl 3,3'-thiodipropionate, distearyl 3,3'-thiodipropionate, dioctadecyl 3,3'-thiodipropionate, lauryl stearyl thiodipropionate, tetrakis[methylene-3-(dodecylthio)propionate]methane, thiobis(2-tert-butyl-5-methyl-4,1-phenylene)bis(3-(dodecylthio)propionate), 2,2'-thiodiethylenebis(3-aminobutenoate), 4,6-bis(octylthiomethyl)-o-cresol, 2,2'-thiodiethylenebis[3-(3,5-di-tert-butyl-4-hydroxyphenyl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl) thioacetate, 4,4'-thiobis(6-tert-butyl-3-methylphenol), 4,47-thiobis(4-methyl-6-tert-butylphenol), 4,4'-[thiobis(methylene)]bis(2-tert-butyl-6-methyl-1-hydroxybenzyl), bis(4,6-di-tert-butylphenol-2-yl) sulfide, tridecyl 3,5-di-tert-butyl-4-hydroxybenzylthioacetate, 1,4-bis(octylthiomethyl)-6-methylphenol, 2,4-bis(dodecylthiomethyl)-6-methylphenol, distearyl disulfide, and bis (methyl-4-[3-n-alkyl(C12/C14)thiopropionyloxy]-5-tert-butylphenyl) sulfide. These thioether antioxidants may be used either individually or in combination.

The thioether antioxidant content of the flame retardant composition is selected from the range that does not impair the effects of the invention and is preferably 0.001 to 5 parts, more preferably 0.01 to 1.0 part, by mass per 100 parts by mass of the flame retardant composition.

Examples of the other antioxidants include nitrone compounds, such as N-benzyl-α-phenylnitrone, N-ethyl-α-methylnitrone, N-octyl-α-heptylnitrone, N-lauryl-α-undecylnitrone, N-tetradecyl-α-tridecylnitrone, N-hexadecyl-α-pentadecylnitrone, N-octyl-α-heptadecylnitrone, N-hexadecyl-α-heptadecylnitrone, N-octadecyl-α-pentadecylnitrone, N-heptadecyl-α-heptadecylnitrone, and N-octadecyl-α-heptadecylnitrone; and benzofuran compounds, such as 3-arylbenzofuran-2(3H)-one, 3-(alkoxyphenyl)benzofuran-2-one, 3-(acyloxyphenyl)benzofuran-2(3H)-one, 5,7-di-tert-butyl-3-(3,4-dimethylphenyl)-benzofuran-2(3H)-one, 5,7-di-tert-butyl-3-(4-hydroxyphenyl)-benzofuran-2(3H)-one, 5,7-di-t-butyl-3-{4-(2-hydroxyethoxy)phenyl}-benzofuran-2(3H)-one, 6-(2-(4-(5,7-di-tert-2-oxo-2,3-dihydrobenzofurn-3-yl)phenoxy)ethoxy)-6-oxohexyl 6-((6-hydroxyhexanoyl)oxy)hexanoate, and 5-di-tert-butyl-3-(4-((15-hydroxy-3,6,9,13-tetraoxapentadecyl)oxy)phenyl)benzofuran-2(3H)-one. These other antioxidants may be used either individually or in combination thereof.

The content of the other antioxidants in the flame retardant composition of the invention is selected from the range that does not impair the effects of the invention and is preferably 0.001 to 5 parts, more preferably 0.01 to 1.0 part, by mass per 100 parts by mass of the flame retardant composition.

Examples of the nucleating agent include metal carboxylates, such as sodium benzoate, aluminum 4-tert-butylbenzoate, sodium adipate, and disodium bicyclo[2.2.1]heptane-2,3-dicaboxylate; phosphoric ester metal salts, such as sodium bis(4-tert-butylphenyl) phosphate, sodium 2,2'-methylenebis(4,6-di-tert-butylphenyl) phosphate, and lithium 2,2'-methylenebis(4,6-di-tert-butylphenyl) phosphate; polyhydric alcohol derivatives, such as dibenzylidene sorbitol, bis(methylbenzylidene)sorbitol, bis(3,4-dimethylbenzydene)sorbitol, bis(p-ethylbenzydene)sorbitol, bis(dimethylbenzylidene) sorbitol, 1,2,3-trideoxy-4,6:5,7-bis-O-((4-propylphenyl)methylene)-nonitol, 1,3:2,4-bis(p-methylbe nzylidene) sorbitol, and 1,3:2,4-bis-O-benzylidene-D-glucitol; and amide compounds, such as N,N',N'''-tris[2-methylcyclohexyl]-1,2,3-propanetricarboxamide, N,N',N''-tricyclohexyl-1,3,5-benzenetricarboxamide, N,N'-dicyclohexylnaphthalenedicarboxamide, and 1,3,5-tri(dimethylisopropylamino)benzene. These nucleating agents may be used either individually or in combination thereof.

The content of the nucleating agent in the flame retardant composition of the invention is selected from the range that does not impair the effects of the invention and is preferably 0.001 to 5 parts, more preferably 0.01 to 1.0 part, by mass per 100 parts by mass of the flame retardant composition.

Examples of the lubricant include hydrocarbon lubricants, such as low molecular waxes, paraffin wax, polyethylene wax, chlorinated hydrocarbons, and fluorocarbons; natural waxes, such as carnauba wax and candelilla wax; fatty acid lubricants, including higher fatty acids, such as lauric acid, stearic acid, and behenic acid, and hydroxy fatty acids, such as hydroxystearic acid; aliphatic amide lubricants, including aliphatic amide compounds, such as stearamide, lauramide, and oleamide, and alkylenebis aliphatic amide compounds, such as methylenebisstearamide and ethylenebisstearamide; fatty acid alcohol ester lubricants, including fatty acid monohydric alcohol esters, such as stearyl stearate, butyl stearate, and distearyl phthalate, fatty acid polyhydric alcohol esters, such as glycerol triacetate, sorbitol tristearate, pentaerythritol tetrastearate, dipentaerythritol hexastearate, polyglycerol polyricinoleate, and hydrogenated castor oil, and complex esters formed from a monobasic fatty acid, a polybasic organic acid, and a polyhydric alcohol, such as dipentaerythritol adipate stearate; aliphatic alcohol lubricants, such as stearyl alcohol, lauryl alcohol, and palmityl alcohol; metal soaps formed from aliphatic alcohols and metals, such as alkaline earth metals, titanium, zirconium, iron, cobalt, nickel, copper, zinc, and aluminum; montanoic acid derivative lubricants, such as partially saponified montanoic esters; acrylic lubricants, silicone oil lubricants, and silane coupling lubricants. Examples of useful silicone oil lubricants include dimethyl silicone oil, which is polysiloxane having methyl at all the side chains and both terminals (commercially available under the names KF-96, KF-965, and KF-968 from Shin-Etsu Chemical Co., Ltd.), methylphenyl silicone oil, which is polysiloxane having phenyl on part of its side chains (commercially available under the names KF-50, KF-53, KF-54, and KF-56 from Shin-Etsu Chemical), methylhydrogen silicone oil, which is polysiloxane having hydrogen on part of the side chains (commercially available under the names KF-99 and KF-9901 from Shin Etsu Chemical, and HMS-151, and, HMS-071, HMS-301, and DMS-H21 from Gelest, Inc.), and copolymers thereof. Modified silicone oils derived from these silicone oils by introducing an organic group to part of their side chains and/or terminals are also useful, including amino-modified silicone oils (e.g., KF-393 from Shin-Etsu Chemical), epoxy-modified silicone oils (e.g., X-22-343, X-22-2000, KF-101, KF-102, and KF-1001 from Shin-Etsu Chemical), alicyclic epoxy-modified silicone oils, carboxyl-modified silicone oils (e.g., X-22-3701E from Shin-Etsu Chemical), carbinol-modified silicone oils (e.g., X-22-4039 and X-22-4015 from Shin-Etsu Chemical); and mercapto-modified, polyether-modified, long-chain alkyl-modified, fluoroalkyl-modified, higher fatty acid ester-modified, higher fatty acid amide-modified, silanol-modified, diol-modified, phenol-modified and/or aralkyl-modified silicone oils.

Examples of the silane coupling agents include alkenyl-functional silane coupling agents, such as vinyltrimethoxysilane (e.g., KBM-1003 from Shin-Etsu Chemical, A-171 from Momentive Performance Materials Japan, Z-6300 from Dow Corning Toray Co., Ltd., GENIOSIL XL10 from Wacker Asahikasei Silicone Co., Ltd., and Sila Ace 5210 from Nichibi Trading Co., LTD.), vinyltriethoxysilane (e.g., KBE-10003 from Shin-Etsu Chemical, A-151 from Momentive Performance Materials Japan, Z-6519 from Dow Corning Toray, GENIOSIL GF56 from Wacker Asahikasei Silicone, and Sila Ace 5220 from Nichibi Trading), vinyltriacetoxysilane (e.g., GENIOSIL GF62 from Wacker Asahikasei Silicone), vinyltris(2-methoxyethoxy)silane (e.g., A-172 from Momentive Performance Materials Japan), vinylmethyldimethoxysilane (e.g., A-2171 from Momentive Performance Materials Japan and GENIOSIL XL12 from Wacker Asahikasei Silicone), octenyltrimethoxysilane (e.g., KBM-1083 from Shin-Etsu Chemical), allyltrimethoxysilane (e.g., Z-6825 from Dow Corning Toray), and p-styryltrimethoxysilane (e.g., KBM-1403 from Shin-Etsu Chemical); acryl-functional silane coupling agents, such as 3-acryloxypropyltrimethoxysilane and 3-acryloxypropyltriethoxysilane (e.g., KBM-5103 from Shin-Etsu Chemical); methacryl-functional silane coupling agents, such as 3-methacryloxypropylmethyldimethoxysilane (e.g., KBM-502 from Shin-Etsu Chemical and Z-6033 from Dow Coring Toray), 3-methacryloxypropyltrimethoxysilane (e.g., KBM-503 from Shin-Etsu Chemical, A-174 from Momentive Performance Materials Japan, Z-6030 from Dow Corning Toray, GENIOSIL GF31 from Wacker Asahikasei Silicone, and Sila Ace 5710 from Nichibi Trading), 3-methacryloxypropylmethyldiethoxysilane (e.g., KBE-502 from Shin-Etsu Chemical), 3-methacryloxypropyltriethoxysilane (e.g., KBE-503 from Shin-Etsu Chemical and Y-9936 from Momentive Performance Materials Japan), and methacryloxyoctyltrimethoxysilane (e.g., KBM-5803 from Shin-Etsu Chemical); epoxy-functional silane coupling agents, such as 2-(3,4-epoxycyclohexyl)ethyltrimethoxysilane (e.g., KBM-303 from Shin-Etsu Chemical, A-186 from Momentive Performance Materials Japan, Z-6043 from Dow Corning Toray, and Sila Ace 5530 from Nichibi Trading), 3-glycidoxypropylmethyldimethoxysilane (e.g., KBM-402 from Sin-Etsu Chemical, Z-6044 from Dow Corning Toray, and Sila Ace S520 from Nichibi Trading), 3-glycidoxypropyltrimethoxysilane (e.g., KBM-403 from Shin-Etsu Chemical, A-187 from Momentive Performance Materials Japan, Z-6040 from Dow Corning Toray, GENIOSIL GF80 from Wacker Asahikasei Silicone, and Sila Ace S510 from Nichibi Trading), 3-glycidoxypropylmethyldiethoxysilane (e.g., KBE-402 from Shin-Etsu Chemical), 3-glycidoxypropyltriethoxysilane (e.g., KBE-403 from Shin-Etsu Chemical, A-1871 from Momentive Performance Materials Japan, and GENIOSIL GF82 from Wacker Asahikasei Silicone, and glycidoxyoctyltrimethoxysilane (e.g., KBM-4803 from Shin-Etsu Chemical); amino-functional silane coupling agents, such as N-2-(aminoethyl)-3-aminopropylmethyldimethoxysilane (e.g., KBM-602 from Shin-Etsu Chemical, A-2120 from Momentive Performance Materials Japan, GENIOSIL GF-95 from Wacker Asahikasei Silicone, and Sila Ace S310 from Nichibi Trading), N-2-(aminoethyl)-3-aminoporopyltrimethoxysilane (e.g., KBM-603 from Shin-Etsu Chemical, A-1120 and A-1122 both from Momentive Performance Materials Japan, Z-6020 and Z-6094 both from Dow Corning Toray, GENIOSIL GF-91 from Wacker Asahikasei Silicone, and Sila Ace 5320 from Nichibi Trading), 3-aminopropyltrimethoxysilane (e.g., KBM-903 from Shin-Etsu Chemical, A-1110 from Momentive Performance Materials Japan, Z-6610 from Dow Corning Toray, and Sila Ace S360 from Nichibi Trading), 3-aminopropyltriethoxysilane (e.g., KBE-903, A-1100 from Momentive Performance Materials Japan, Z-6011 from Dow Corning Toray, and Sila Ace S330 from Nichibi Trading), 3-triethoxysilyl-N-(1,3-dimethylbutylidene)propylamine (e.g., KBE-9103 from Shin-Etsu Chemical and Sila Ace 5340 from Nichibi Trading), N-phenyl-3-aminopropyltrimethoxysilane (e.g., KBM-573 from Shin-Etsu Chemical, Y-9669 from Momentive Performance Materials Japan, and Z-6883 from Dow Corning Toray), N,N'-bis[3-(trimethoxysilyl)propyl]ethylenediamine (e.g., Sila Ace XS1003 from Nichibi Trading), and N-(vinylbenzyl)-2-aminoethyl-3-aminopropyltrimethoxysilane hydrochloride (e.g., KBM-575 from Shin-Etsu Chemical, Z-6032 from Dow Corning Toray, and Sila Ace S350 from Nichibi Trading); isocyanurate-functional silane coupling agents, such as tris(trimethoxysilylpropyl) isocyanurate (e.g., KBM-9659 from Shin-Etsu Chemical); mercapto-functional silane coupling agents, such as 3-mercaptopropylmethyldimethoxysilane (e.g., KBM-802 from Shin-Etsu Chemical and Z-6852 from Dow Corning Toray), 3-mercaptopropyltrimethoxysilane (e.g., KBM-803 from Shin-Etsu Chemical, A-189 from Momentive Performance Materials Japan, Z-6062 from Dow Corning Toray, and Sila Ace S810 from Nichibi Trading), and 3-mercaptopropyltriethoxysilane (e.g., A-1891 from Momentive Performance Materials Japan and Z-6911 from Dow Corning Toray); ureido-functional silane coupling agents, such as 3-ureidopropyltrialkoxyxysilane (e.g., KBE-585 from Shin-Etsu Chemical), 3-ureidopropyltrimethoxysilane, and 3-ureidopropyltriethoxysane (e.g., A-1160 from Momentive Performance Materials Japan); sulfide-functional silane coupling agents, such as bis(triethoxysilylpropyl) tetrasulfide; thioester-functional silane coupling agents, such as 3-octanoylthio-1-propyltriethoxysilane (e.g., A-LINK 599 from Momentive Performance Materials Japan); and isocyanate-functional silane coupling agents, such as 3-isocyanatopropyltriethoxysilane (e.g., KBE-9007 from Shin-Etsu Chemical and A-1310 from Momentive Performance Materials Japan) and 3-isocanatopropyltrimethoxysilane (e.g., Y-5187 from Momentive Performance Materials Japan and GENIOSIL GF40 from Wacker Asahikasei Silicone). These lubricants may be used either individually or in combination thereof.

The lubricant content of the flame retardant composition of the invention is selected from the range that does not impair the effects of the invention and is preferably 0.01 to 10 parts, more preferably 0.03 to 3 parts, by mass per 100 parts by mass of the resin.

Examples of the fatty acid of the fatty acid metal salt include saturated fatty acids, such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanoic acid, and melissic acid; straight chain unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid; and aromatic fatty acids, such as trimesic acid. Saturated fatty acids, such as myristic acid, stearic acid, and 12-hydroxystearic acid, are preferred.

Examples of the ultraviolet absorbers include benzophenone compounds, such as 2,4-dihydroxybenzophenone, 5,5'-methylenebis(2-hydroxy-4-methoxybenzophenone), 2-hydroxy-4-n-octoxybenzophenone, 2-hydroxy-4-methoxybenzophenone, 2-hydroxy-4-dodecyloxybenzophenone, and 2,2'-dihydroxy-4-methoxybenzophenone; benzotriazole compounds, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2-methylenebis(4-tert-octyl-6-benzotriazolylphenol), 2-(2-hydroxy-3-tert-butyl-5-carboxyphenyl)benzotriazole polyethylene glycol ester, 2-[2-hydroxy-3-(2-acryloyloxy ethyl)-5-methylphenyl]benzotriazole, 2-[2-hydroxy-3-(2-methacryloyloxyethyl)-5-tert-butylphenyl] benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl 3,5-di-tert-butyl-4-hydroxybenzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy)benzoate, octadecyl (3,5-di-tert-butyl-4-hydroxy)benzoate, and behenyl (3,5-di-tert-butyl-4-hydroxy)benzoate; substituted oxanilides, such as 2-ethyl-2'-ethoxyoxanilide, 2-ethoxy-4'-dodecyloxanilide, and 2-ethyl-2'-ethoxy-5'-tert-butyloxanilide; cyanoacrylates, such as ethyl α-cyano-(β,β-diphenylacrylate, methyl 2-cyano-3-methyl-3-(p-methoxyphenyl)acrylate, and tetrakis(α-cyano-β,β-diphenylacryloyloxymethyl)methane; and triazines, such as 2-(2-hydroxy-4-(2-(2-ethylhexanoyloxy)ethyloxy)-4,6-diphenyl-1,3,5-triazine, 2,4,6-tris(2-hydroxy-4-hexyloxy-3-methylphenyl)-1,3,5-triazine, 2-(2-hydroxy-4-octyloxyphenyl)-4,6-bis(2,4-dimethylphenyl)-1,3,5-triazine, 2-(4,6-diphenyl-1,3,5-triazin-2-yl)-5-hexyloxyphenol, and 2-(4,6-di(1,1'-biphenyl)-4-yl)-1,3,5-triazin-2-yl)-5-(2-ethylhexyloxy)phenol. These UV absorbers may be used either individually or in combination.

The UV absorber content of the flame retardant composition of the invention is selected from the range that does not impair the effects of the invention and is preferably 0.001 to 5 parts, more preferably 0.005 to 0.5 parts, by mass per 100 parts by mass of the flame retardant composition.

Examples of the light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)di(tridecyl) 1,2,3,4-butanetetracarboxylate, bis(1,2,2,6,6-pentamethyl-4-piperidyl)di(tridecyl) 1,2,3,4-butanetetracarboxylate, bis(1,2,2,4,4-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine poly condensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2,4-bis(N-butyl-N-(1,2,2,6,6-pentamethyl-4-piperidyl)amino)-s-triazin-6-yl]a minoundecane, bis {4-(1-octyloxy-2,2,6,6-tetramethyl)piperidyl} decanedionate, bis {4-(2,2,6,6-tetramethyl-1-undecyloxy) piperidyl}carbonate, TINUVIN NOR 371 from Ciba Specialty Chemicals, 2,2,6,6-tetramethyl-4-piperidyl methacrylate; 1,2,3,4-butanetetracarboxylic acid, polymer with 2,2-bis(hydroxymethyl)-1,3-propanediol and 3-hydroxy-2,2-dimethylpropanal, 1,2,2,6,6-pentamethyl-4-piperidinyl ester; 1,3-bis(2,2,6,6-tetramethylpiperidin-4-yl)-2,4-ditridecylbenzene-1,2,3,4-tetracarboxylate, bis(1-octyloxy-2,2,6,6-pentamethyl-4-piperidyl) sebacate, and poly[[6[[(1,1,3,3-tetramethylbutyl)amino]-1,3,5-triazin-2,4-diyl][(2,2,6,6-tetramethyl-4-pi peridinyl)imino]-1,6-hexanediyl[(2,2,6,6-tetramethyl-4-piperidinyl)imino]]). These light stabilizers may be used either individually or in combination.

The content of the light stabilizer in the flame retardant composition is selected from the range that does not impair the effects of the invention and is preferably 0.001 to 5 parts, more preferably 0.005 to 0.5 parts, by mass per 100 parts by mass of the flame retardant composition.

Examples of the other flame retardants include halogen, phosphorus, nitrogen, and metal hydroxide flame retardants. Examples of the halogen flame retardants include chlorine flame retardants, such as tris(chloropropyl) phosphate, and bromine flame retardants, such as tris(tribromoneopentyl) phosphate, brominated bisphenol-A epoxy resin, brominated phenol novolak epoxy resin, hexabromobenzene, pentabromotoluene, ethylenebis(pentabromophenyl), ethylenebistetrabromophthalimide, 1,2-dibromo-4-(1,2-dibromoethyl) cyclohexane, tetrabromocyclooctane, hexabromocyclododecane, bis(tribromophenoxy)ethane, brominated polyphenylene ether, brominated (poly)styrene, 2,4,6-tris (tribromophenoxy)-1,3,5-triazine, tribromophenylmaleimide, tribromophenyl acrylate, tribromophenyl methacrylate, tetrabromobisphenol-A dimethacrylate, pentabromobenzyl acrylate, and commercially available products (e.g., CR-504L, CR-570, and DAIGUARD-540, all from Daihachi Chemical Ind. Co., Ltd.).

Examples of the phosphorus flame retardants include inorganic phosphorus flame retardants, such as red phosphorus; aliphatic phosphoric ester flame retardants, such as trimethyl phosphate and triethyl phosphate; and aromatic phosphoric ester flame retardants, such as triphenyl phosphate, tricresyl phosphate, trixylenyl phosphate, cresyldiphenyl phosphate, cresyl-2,6-dixylenyl phosphate, resorcinol bis(diphenyl phosphate), (1-methylethylidene)-4,1-phenylenetetraphenyl diphosphate, 1,3-phenylenetetrakis(2, 6-dimethylphenyl) phosphate, and commercially available products (e.g., ADK Stab FP-500, ADK Stab FP-600, ADK Stab FP-700, ADK Stab FP-800, and ADK Stab PFR, all from Adeka Corp.; and DAIGUARD-1000, CR-733S, CR-741, PX-200, PX-202, DAIGUARD-580, and DAI-GUARD-880, all from Daihachi Chemical Ind.).

Examples of the nitrogen flame retardants include melamine cyanurate.

Examples of the metal oxide flame retardants include magnesium hydroxide and aluminum hydroxide.

The other flame retardants may be used either individually or in combination thereof. The content of the other flame retardants in the flame retardant composition of the invention is selected from the range that does not impair the effects of the invention and is preferably 1 to 400 parts, more preferably 3 to 200 parts, even more preferably 5 to 100 parts, by mass per 100 parts by mass of the flame retardant composition.

Examples of the plasticizer include epoxidized plasticizers, such as epoxidized soybean oil, epoxidized linseed oil, and epoxidized fatty acid octyl esters; methacrylate plasticizers; polyester plasticizers, such as dicarboxylic acid/polyhydric alcohol polycondensates and polycarboxylic acid/polyhydric alcohol polycondensates; polyether ester plasticizers, such as dicarboxylic acid/polyhydric alcohol/alkylene glycol polycondensates, dicarboxylic acid/polyhydric alcohol/arylene glycol polycondensates, polycarboxylic acid/polyhydric alcohol/alkylene glycol polycondensates, and polycarboxylic acid/polyhydric alcohol/arylene glycol polycondensates; aliphatic ester plasticizers, such as adipic esters and succinic esters; and aromatic ester plasticizers, such as phthalic esters, terephthalic esters, trimellitic esters, pyromellitic esters, and benzoic esters. These plasticizers may be may be used either individually or in combination thereof.

The plasticizer content of the flame retardant composition is selected from the range that does not impair the effects of the invention and is preferably 0.1 to 500 parts, more preferably 1 to 100 part, even more preferably 3 to 80 parts, by mass per 100 parts by mass of the flame retardant composition.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, mica, silica, alumina, potassium titanate whisker, wollastonite, fibrous magnesium oxysulfate, and montmorillonite. The filler to be used is selected appropriately according to the particle size (or diameter, length, and aspect ratio of fibrous fillers).

The filler content of the flame retardant composition is selected from the range that does not impair the effects of the invention and is preferably 0.01 to 500 parts, more preferably 1 to 100 parts, even more preferably 3 to 80 parts, by mass per 100 parts by mass of the flame retardant composition.

Examples of the metal for the fatty acid metal salt include alkali metals, magnesium, calcium, strontium, barium, titanium, manganese, iron, zinc, silicon, zirconium, yttrium, barium, and hafnium. Alkali metals, such as sodium, lithium, and potassium, are particularly preferred. The fatty acid metal salts may be used either individually or in combination.

The content of the fatty acid metal salt in the flame retardant composition is selected from the range that does not impair the effects of the invention and is preferably 0.001 to 5 parts, more preferably 0.05 to 3 parts, by mass per 100 parts by mass of the flame retardant composition.

Examples of the antistatic include cationic antistatics, such as fatty acid quaternary ammonium ion salts and quaternary polyamine salts; anionic antistatics, such as higher alcohol phosphoric ester salts, higher alcohol EO adducts, polyethylene glycol fatty acid esters, anionic alkylsulfonates, higher alcohol sulfuric ester salts, higher alcohol ethylene oxide adduct sulfuric ester salts, and higher alcohol ethylene oxide adduct phosphoric ester salts; non-ionic antistatics, such as polyhydric alcohol fatty acid esters, polyglycol phosphoric esters, and polyoxyethylene alkyl allyl ethers; and amphoteric antistatics, such as amphoteric alkyl betaines, e.g., alkyl dimethylaminoacetic acid betaine, and amphoteric imidazoline surfactants. These antistatics may be used either individually or in combination of two or more thereof.

The antistatic content of the flame retardant composition is selected from the range that does not impair the effects of the invention and is preferably 0.01 to 20 parts, more preferably 3 to 10 parts, by mass per 100 parts by mass of the flame retardant composition.

The pigment may be chosen from commercially available products, including pigment red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; pigment orange 13, 31, 34, 36, 38, 43, 46, 48, 49, 51, 52, 55, 59, 60, 61, 62, 64, 65, and 71; pigment yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; pigment green 7, 10, and 36; pigment blue 15, 15:1, 15:2, 15:3, 15:4, 15:5, 15:6, 22, 24, 56, 60, 61, 62, and 64; and pigment violet 1, 19, 23, 27, 29, 30, 32, 37, 40, and 50. These pigments may be used either individually or in combination of two or more thereof.

The pigment content in the flame retardant composition of the invention is selected from the range that does not impair the effects of the invention and is preferably 0.0001 to 10 parts by mass per 100 parts by mass of the flame retardant composition.

The dye may be a commercially available product. Examples include azo dyes, anthraquinone dyes, indigoid dyes, triarylmethane dyes, xanthene dyes, alizarine dyes, acridine dyes, stilbene dyes, thiazole dyes, naphthol dyes, quinoline dyes, nitro dyes, indamine dyes, oxazine dyes, phthalocyanine dyes, and cyanine dyes. These dyes may be used either individually or as a mixture thereof.

The dye content of the flame retardant composition is selected from the range that does not impair the effects of the invention and is preferably 0.0001 to 10 parts by mass per 100 parts by mass of the flame retardant composition.

Flame-Retardant Resin Composition

As used herein, the term "flame-retardant resin composition" refers to a composition containing at least one resin and at least one flame retardant composition of the invention.

The resin composition of the invention preferably contains the flame retardant composition of the invention in an amount of 10 to 400 parts, more preferably 10 to 300 parts, even more preferably 10 to 80 parts, by mass per 100 parts by mass of the resin. The flame retardancy of the resin is improved by the addition of at least 10 parts of the flame retardant composition. The processability of the resin is not impaired when the content of the flame retardant composition is not more than 400 parts.

Examples of the resin for use in the flame-retardant resin composition of the invention include thermoplastic resins, such as polyolefin resins, polyester resins, vinyl resins, polycarbonate resins, acrylic resins, styrene resins, polyamide resins, polyphenylene oxide resins, and polyphenylene sulfide resins. These resins may be used either alone or in combination thereof. The resins may be alloyed resins.

The resin preferably has a melt flow rate (MFR) of 2.0 to 80 g/10 min, more preferably 8.0 to 60 g/10 min, as measured at 230° C. and a 2.16 kg load in accordance with JIS K7210, in view of processability and flame retardancy.

Examples of the polyolefin resins include polyethylene resins, such as polyethylene, low density polyethylene, linear low density polyethylene, and high density polyethylene; polypropylene resins, such as polypropylene, homopolypropylene, random copolymer polypropylene, block copolymer polypropylene, impact copolymer polypropylene, high impact copolymer polypropylene, isotactic polypropylene, syndiotactic polypropylene, hemisotactic polypropylene, maleic anhydride-modified polypropylene, stereoblock polypropylene; α-olefin polymers, such as polybutene, cycloolefin polymers, poly-3-methyl-1-butene, poly-3-methyl-1-pentene, and poly-4-methyl-1-pentene; and α-olefin copolymers, such as ethylene-propylene block or random copolymers, ethylene-methyl methacrylate copolymers, and ethylene-vinyl acetate copolymers.

Examples of the polyester resins include saturated polyester resins obtained by using a diacid, e.g., terephthalic acid, or a derivative thereof capable of forming an ester, as an acid component and a C2-C10 glycol or other dihydric alcohols or a derivative thereof capable of forming an ester, as a glycol component. Preferred of them are polyalkylene terephthalates in view of their well-balanced properties, such as processability, mechanical characteristics, electrical properties, and heat resistance. Examples of the polyalkylene terephthalates include polyethylene terephthalate, polybutylene terephthalate, and polycyclohexanedimethylene terephthalate.

Examples of the vinyl resins include homopolymers of vinyl monomers, such as vinyl esters (e.g., vinyl acetate), chlorine-containing vinyl compounds (e.g., vinyl chloride), vinyl ketones, vinyl ethers, and vinylamines (e.g., N-vinylcarbazole), or copolymers composed of two or more of these vinyl monomers; and copolymers of the vinyl monomers and other copolymerizable monomers. Derivatives of the vinyl resins, such as polyvinyl alcohol, polyvinyl acetals (e.g., polyvinyl formal and polyvinyl butyral), and ethylene-vinyl acetate copolymers, are also useful.

Examples of the polycarbonate resins include those obtained by the reaction between at least one bisphenol and phosgene or a carbonic acid diester and those obtained by interesterification between at least one bisphenol and a diphenyl carbonate. Examples of the bisphenol include hydroquinone, 4,4-dihydroxyphenyl, bis(4-hydroxyphenyl) alkanes, bis(4-hydroxyphenyl)cycloalkanes, bis(4-hydroxyphenyl) sulfide, bis(4-hydroxyphenyl) ether, bis(4-hydroxyphenyl) ketone, bis(4-hydroxyphenyl) sulfone, bisphenol fluorene, and their alkyl-, aryl-, or halogen-substituted derivatives. These polycarbonate resins may be used either alone or in combination of two or more thereof.

The polycarbonate resin may be used in the form of a polymer alloy obtained by blending the polycarbonate resin with other resins. Examples of such a polymer alloy include polycarbonate/ABS resin, polycarbonate/AS resin, polycarbonate/rubber polymer, polycarbonate/ABS resin/rubber polymer, polycarbonate/polyethylene terephthalate, poly carbonate/polybutylene terephthalate, poly carbonate/ASA resin, and polycarbonate/AES resin. The proportion of the polycarbonate resin in the polymer alloy is preferably 50 to 98 mass %.

Examples of the acrylic resins include polymers composed mainly of a (meth)acrylic ester, such as methyl (meth)acrylate, ethyl (meth)acrylate, butyl (meth)acrylate, or 2-ethylhexyl (meth)acrylate. The acrylic resin may be a homopolymer of such a (meth)acrylic ester or a copolymer of at least 50 mass % of the (meth)acrylic ester and at most 50 mass % of a copolymerizable monomer. Examples of the copolymerizable monomer include monofunctional monomers, such as aromatic alkenyl compounds (e.g., styrene, α-methylstyrene, and vinyltoluene), alkenyl cyanides (e.g., acrylonitrile and methacrylonitrile), unsaturated carboxylic acids (e.g., acrylic acid and methacrylic acid), maleic anhydride, and N-substituted maleimide; and polyfunctional monomers, such as polyhydric alcohol esters of polyunsaturated carboxylic acids (e.g., ethylene glycol dimethacrylate, butanediol dimethacrylate, and trimethylolpropane triacrylate), alkenyl esters of unsaturated carboxylic acids (e.g., allyl acrylate, allyl methacrylate, and allyl cinnamate), polyalkenyl esters of polybasic acids (e.g., diallyl phthalate, diallyl maleate, triallyl cyanurate, and triallyl isocyanurate), and aromatic polyalkenyl compounds (e.g., vinylbenzene).

Examples of the styrene resins include homo- and copolymers of styrene monomers (e.g., styrene and vinyltoluene); copolymers of a styrene monomer and a vinyl monomer, such as a (meth)acrylic monomer (e.g., (meth)acrylonitrile, (meth)acrylic esters, and (meth)acrylic acid), an α,β-monoolefinically unsaturated carboxylic acid or its anhydride or ester (e.g., maleic anhydride); styrene graft copolymers; and styrene block copolymers.

Examples of the polyamide resins include aliphatic polyamides, such as polyamide 46, polyamide 6, polyamide 66, polyamide 610, polyamide 612, polyamide 11, and polyamide 12; alicyclic polyamides obtained from alicyclic diamines (e.g., bis(aminocyclohexyl) C1-C3 alkanes) and aliphatic dicarboxylic acids (e.g., C8-C14 alkanedicarboxylic acids); polyamides obtained from aromatic dicarboxylic acids (e.g., terephthalic acid and/or isophthalic acid) and aliphatic diamines (e.g., hexamethylenediamine and nonamethylenediamine); and polyamides obtained from aromatic and aliphatic dicarboxylic acids (e.g., terephthalic acid and adipic acid) and aliphatic diamines (e.g., hexamethylenediamine).

Examples of the polyphenylene oxide resins include homopolymers, such as poly(mono-, di- or tri-(C1-C6 alkyl) phenylene)) oxides (e.g., poly(2,6-dimethyl-1,4-phenylene) oxide, poly(2,5-dimethyl-1,4-phenylene) oxide, and poly(2,5-diethyl-1,4-phenylene) oxide), poly(mono- or di-(C6-C20 aryl)-phenylene)) oxides, and poly(mono(C1-C6 alkyl)-mono(C6-C20 aryl)-phenylene) oxides; random copolymers having a 2,6-dimethyl-1,4-phenylene oxide unit and a 2,3,6-trimethyl-1,4-phenylene oxide unit; modified polyphenylene oxide copolymers composed of (i) an alkylphenol-modified benzene-formaldehyde resin block obtained by the reaction between a benzene-formaldehyde resin (e.g., phenol resin) or an alkylbenzene-formaldehyde resin and an alkylphenol (e.g., cresol) and, as a main structure, (ii) a polyphenylene oxide block; and modified graft copolymers composed of polyphenylene oxide or a copolymer thereof having a styrene polymer and/or an unsaturated carboxylic acid or an anhydride thereof (e.g., (meth)acrylic acid or maleic anhydride) grafted thereto.

Examples of the polyphenylene sulfide resins include homopolymers and copolymers having a phenylene sulfide structure —(Ar—S)—, wherein Ar is a phenylene group. Examples of the phenylene group —Ar— include p-, m-, or o-phenylene group, a substituted phenylene group (for example, an alkylphenylene group having, e.g., a C1-C6 alkyl group as a substituent or an arylphenylene group having, e.g., a phenyl group as a substituent), and —Ar-A$^1$-Ar—, wherein Ar is a phenylene group; and A$^1$ is a direct bond, O, CO, or $SO_2$.

The resin and the flame retardant composition of the invention can be compounded by a known method without any limitations. For example, they may be compounded by mixing using an ordinary blender or mixer, melt-kneading using an extruder, or solution-casting using a solvent.

Molded Article

The molded article of the invention is obtained by molding the resin composition of the invention. The methods and conditions for molding the resin composition are not particularly limited, and known molding methods and conditions may be adopted. Suitable molding methods include extrusion molding, injection molding, inflation molding, and blow molding. These molding methods may be carried out under known molding conditions.

The shapes of the molded articles obtained by molding the resin composition of the invention are not particularly limited and include sheets, films, and other specific shapes.

The applications of the molded articles are not particularly limited and include food containers, electronic components, automotive parts, medical materials, film/sheet materials, fibrous materials, optical materials, and resins for coatings, inks, toners, and adhesives. The molded articles of the invention are especially suited for use as electronic components, such as wire, and automotive parts, such as automobile interior and exterior trim.

EXAMPLE

The invention will now be illustrated in greater detail with reference to Examples, but the invention is not deemed to be limited thereto. Unless otherwise noted, all the parts and percentages are by mass.

Preparation of Resin Compositions:

Examples 1 to 28

A hundred parts of polypropylene (MFR: 8 g/10 min, measured according to JIS K7210 at 230° C. and 2.16 kg load), 0.07 parts of calcium stearate as a higher fatty acid metal salt, 0.14 parts of tetrakis[3-(3,5-di-t-butyl-4-hydroxyphenyl)methyl propionate]methane as a phenolic antioxidant, and 0.14 parts of tris(2,4-di-t-butylphenyl) phosphite as a phosphite antioxidant were premixed in a Henschel mixer to prepare a polypropylene resin composition. To the polypropylene resin composition was added each of the flame retardant compositions shown in Tables 1 and 2 blow in the amount (parts by mass) shown per 100.35 parts of the polypropylene resin composition to make a flame-retardant resin composition of Examples 1 to 28. As component (B), NA-287 from BASK was used.

Comparative Examples 1 to 17

A hundred parts of polypropylene (MFR: 8 g/10 min, measured according to JIS K7210 at 230° C. and 2.16 kg load), 0.07 parts of calcium stearate as a higher fatty acid metal salt, 0.14 parts of tetrakis[3-(3,5-di-t-butyl-4-hydroxyphenyl)methyl propionate]methane as a phenolic antioxidant, and 0.14 parts of tris(2,4-di-t-butylphenyl) phosphite as a phosphorous antioxidant were premixed in a Henschel mixer to prepare a polypropylene resin composition. To the polypropylene resin composition was added each of the comparative flame retardant compositions shown in Table 3 blow and the comparative flame retardant compositions 1 to 3 described below in the amount (parts by mass) shown in Tables 3 and 4 per 100.35 parts of the polypropylene resin composition to make a comparative flame-retardant resin composition. As component (B), NA-287 from BASK was used.

Comparative Flame Retardant Composition 1

| | |
|---|---|
| Trixylenyl phosphate (phosphoric ester) | 90 parts |
| Zinc glycerolate (NA-287 from BASF) | 10 parts |

Comparative Flame Retardant Composition 2

| | |
|---|---|
| Tris(tribromoneopentyl phosphate) (halogen-containing phosphoric ester) | 95 parts |
| Zinc glycerolate (NA-287 from BASF) | 5 parts |

Comparative Flame Retardant Composition 3

| | |
|---|---|
| Piperazine polyphosphate | 90 parts |
| Calcium glycerolate | 10 parts |

Preparation of Pellets:

The resulting flame-retardant resin compositions of Examples and Comparative Examples were each melt-kneaded in a twin-screw extruder (TEX-30α form The Japan Steel Works, Ltd.) at a cylinder temperature of 220 to 250° C. and a screw speed of 150 rpm and extruded through a die into strands, which were cooled in a cooling bath and cut into pellets using a pelletizer.

Preparation of Specimens:

The pellets of each flame-retardant resin composition were injection molded using NEX-80 from Nissei Plastic Industrial Co., Ltd. at a screw temperature of 210° C. and a mold temperature of 40° C. to make a specimen for flammability test measuring 127 mm×12.7 mm×1.6 mm (t).

Evaluation of Flame Retardancy:

The specimen was tested by the 20 mm vertical burning test (UL-94V) in accordance with ISO 1210. Specifically, the specimen was held with the long axis vertical. A flame of a burner was applied to the lower end of the specimen for 10 seconds and removed, and the flame duration was measured. As soon as the specimen stopped burning, the flame was reapplied for an additional 10 seconds, and the flame duration was measured as in the first flame application. Ignition of the cotton layer placed below the specimen by any drips of flaming particles was also observed. The flame duration after each flame application and the ignition of the cotton layer were interpreted into a UL-94V flammability rating. The V-0 rating is the lowest flammability. The V-1 rating is less flame retardancy, and V-2 rating is still less flame retardancy. The results of evaluation are shown in Tables 1 to 4. In Tables 1 through 4, (A), (B), (C), and (D) indicates components (A), (B), (C), and (D), respectively.

TABLE 1

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| (A) + (B) | No. 1 | 38 | | | | | | | 32 | | | | | | |
| | No. 8 | | 36 | | | | | | | 30 | | | | | |
| | No. 16 | | | 33 | | | | | | | 26 | | | | |
| | No. 24 | | | | 35 | | | | | | | 27 | | | |
| | No. 28 | | | | | 36 | | | | | | | 30 | | |
| | No. 31 | | | | | | 37 | | | | | | | 31 | |
| | No. 35 | | | | | | | 38 | | | | | | | 32 |
| (C) | Zinc Oxide*1 | | | | | | | | 2 | 2 | 2 | 2 | 2 | 2 | 2 |
| | Flame Retardancy Rating | V-0 | V-0 | V-0 | V-0 | V-0 | V-0 | V-0 | V-0 | V-0 | V-0 | V-0 | V-0 | V-0 | V-0 |

*1JIS class 1 (from Mitsui Mining & Smelting Co., Ltd.)

TABLE 2

| | | Example | | | | | | | | | | | | | |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| (A) + (B) | No. 1 | 38 | | | | | | | 32 | | | | | | |
| | No. 8 | | 36 | | | | | | | 30 | | | | | |
| | No. 16 | | | 33 | | | | | | | 26 | | | | |
| | No. 24 | | | | 35 | | | | | | | 27 | | | |
| | No. 28 | | | | | 36 | | | | | | | 30 | | |
| | No. 31 | | | | | | 37 | | | | | | | 31 | |
| | No. 35 | | | | | | | 38 | | | | | | | 32 |
| (C) | Zinc Oxide*1 | | | | | | | | 2 | 2 | 2 | 2 | 2 | 2 | 2 |
| (D) | Hydrotalcite *2 | 0.15 | 0.15 | 0.15 | 0.15 | 0.15 | 0.15 | 0.15 | 0.15 | 0.15 | 0.15 | 0.15 | 0.15 | 0.15 | 0.15 |
| | Flame Retardancy Rating | V-0 | V-0 | V-0 | V-0 | V-0 | V-0 | V-0 | V-0 | V-0 | V-0 | V-0 | V-0 | V-0 | V-0 |

*1Zinc oxide JIS class 1 (from Mitsui Mining & Smelting Co., Ltd.)
*2: DHT 4A (from Kyowa Chemical Industry Co., Ltd.)

TABLE 3

| | | Comparative Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| (A) | A-1 | 38 | | | | | | | 32 | | | | | | |
| | A-3 | | 38 | | | | | | | 32 | | | | | |
| | A-4 | | | 38 | | | | | | | 32 | | | | |
| | A-8 | | | | 38 | | | | | | | 32 | | | |
| | A-11 | | | | | 38 | | | | | | | 32 | | |
| | A-23 | | | | | | 38 | | | | | | | 32 | |
| | A-36 | | | | | | | 38 | | | | | | | 32 |
| (C) | Zinc Oxide*1 | | | | | | | | 2 | 2 | 2 | 2 | 2 | 2 | 2 |
| (D) | Hydrotalcite*2 | 0.1 | | 0.1 | | 0.1 | | | | 0.1 | | 0.1 | | 0.1 | |
| | Flame Retardancy Rating | V-2 | V-2 | V-2 | V-2 | V-2 | V-2 | V-2 | V-2 | V-2 | V-2 | V-2 | V-2 | V-2 | V-2 |

*1Zinc oxide JIS class 1 (from Mitsui Mining & Smelting Co., Ltd.)
*2DHT 4A (from Kyowa Chemical Industry Co., Ltd.)

TABLE 4

| | | Comparative Example | | |
|---|---|---|---|---|
| | | 15 | 16 | 17 |
| Comparative Component | Comparative Flame Retardant Composition 1 | 38 | | |
| | Comparative Flame Retardant Composition 2 | | 38 | |
| | Comparative Flame Retardant Composition 3 | | | 38 |
| (C) | Zinc oxide *1 | | 2 | |
| (D) | Hydrotalcite *2 | 0.1 | | 0.1 |
| | Flame Retardancy Rating | NR | NR | NR |

*1: Zinc oxide JIS class 1 (from Mitsui Mining & Smelting Co., Ltd.)
*2: DHT 4A (from Kyowa Chemical Industry Co., Ltd.)

As can be seen from the results of Examples, the flame retardant compositions of the invention, which contain an amine phosphate and a zinc glycerolate, exhibit excellent flame retardancy. In contrast, the flame retardant compositions of Comparative Examples 1 to 14, which do not contain a zinc glycerolate, those of Comparative Examples 15 and 16, which contain a flame retardant other than the amine phosphate, and that of Comparative Example 17, which contains a calcium salt of glycerol in place of the zinc glycerolate, all prove inferior in flame retardancy.

INDUSTRIAL APPLICABILITY

The flame retardant composition according to the invention is capable of improving flame retardancy of resins when added thereto even in small amounts. It exhibits excellent flame retardation effects particularly on polypropylene resins.

The invention claimed is:

1. A flame retardant composition comprising (A) a piperazine pyrophosphate and a melamine pyrophosphate and (B) a zinc glycerolate, wherein the mass ratio of component (A) to component (B) is 99.99:0.01 to 60:40.

2. The flame retardant composition according to claim 1, further comprising (C) zinc oxide, wherein the content of component (C) is 0.01 to 10 parts by mass per 100 parts by mass of the sum of components (A) and (B).

3. The flame retardant composition according to claim 2, further comprising (D) hydrotalcite, wherein the content of component (D) is 0.01 to 5 parts by mass per 100 parts by mass of the sum of components (A) and (B).

4. A flame-retardant resin composition comprising 100 parts by mass of a resin and 10 to 400 parts by mass of the flame retardant composition according to claim 3.

5. A flame-retardant resin composition comprising 100 parts by mass of a resin and 10 to 400 parts by mass of the flame retardant composition according to claim 2.

6. The flame retardant composition according to claim 1, further comprising (D) hydrotalcite, wherein the content of component (D) is 0.01 to 5 parts by mass per 100 parts by mass of the sum of components (A) and (B).

7. A flame-retardant resin composition comprising 100 parts by mass of a resin and 10 to 400 parts by mass of the flame retardant composition according to claim 6.

8. A flame-retardant resin composition comprising 100 parts by mass of a resin and 10 to 400 parts by mass of the flame retardant composition according to claim 1.

9. A molded article obtained by molding the flame-retardant resin composition according to claim 8.

10. The flame-retardant resin composition according to claim 8, wherein the resin is polyolefin resin.

11. The flame retardant composition according to claim 1, wherein the mass ratio of the piperazine pyrophosphate to the melamine pyrophosphate is 90:10 to 10:90.

12. The flame retardant composition according to claim 1, wherein the content of the piperazine pyrophosphate and the melamine pyrophosphate (A) is 30 mass % or more based on the total mass of the flame retardant composition.

13. A method for rendering a resin flame retardant, comprising mixing the resin with a composition comprising (A) a piperazine pyrophosphate and a melamine pyrophosphate and (B) a zinc glycerolate, wherein the mass ratio of component (A) to component (B) is 99.99:0.01 to 60:40.

14. A method of retarding flames comprising providing a composition comprising (A) a piperazine pyrophosphate and a melamine pyrophosphate and (B) a zinc glycerolate, and applying an effective amount of the composition as a flame retardant, wherein the mass ratio of component (A) to component (B) is 99.99:0.01 to 60:40.

* * * * *